Patented Oct. 4, 1938

2,132,013

UNITED STATES PATENT OFFICE 2,132,013

INSECTICIDE

Arthur L. Blount, Palos Verdes Estates, Calif., assignor to Union Oil Company of California, Los Angeles, Calif., a corporation of California No Drawing. Application July 2, 1934,
Serial No. 733,450

5 Claims. (Cl. 167—24)

This invention relates to insecticides, particularly those to be used in the control of garden and orchard pests. The particular object of the invention is to produce from rotenone stable insecticides of such character that they will remain toxic in storage and under conditions of use over considerable periods of time.

Rotenone is a high molecular weight complex ketone contained in derris root and is very easily oxidized, particularly when exposed to light and air as would be the case when rotenone is used as such or in a solution from which it will crystallize on the foliage of plants and trees directly exposed to sunlight and air.

I have discovered that rotenone may be protected against undue oxidation by the use of various stabilizing agents which act as oxidation inhibitors or retarders, or otherwise extend the toxic life of the rotenone. Thus, an agent having anti-oxidant properties (for example monobenzylparaaminophenol) may be commingled with the rotenone, as through the medium of some menstruum or other medium for suitable admixture. Again compounds may be synthesized from rotenone which will hydrolyze slowly to reform the toxic rotenone. In connection with the latter classification biological tests have demonstrated that the oximes and hydrazones of rotenone posses some insecticidal value and therefore do not necessarily have to undergo hydrolysis to reform the rotenone in order to be of some value. However when hydrolysis occurs under conditions of use the toxic value is greatly increased. Where a hydrazone has been produced with phenylhydrazine the regenerated phenylhydrazine displays desirable anti-oxidant properties for protection of the regenerated rotenone. According to this invention rotenone may be converted into various derivatives which do not oxidize easily and which hydrolyze slowly on contact with water. These rotenone derivatives are such that the rotenone may be slowly regenerated by hydrolysis when in contact with moisture during use, dew for example. Both these rotenone derivatives and the rotenone compositions to which oxidation retarders or inhibitors have been added, may be used in connection with sprays, spray oil emulsions, inert powdered bases and the like. Also these derivatives and compositions are soluble in certain volatile solvents through the medium of which they may be employed in the preparation of dusting powders, or by means of which as common solvents they may be distributed in water and in oil spray bases, emulsions and the like.

Therefore, the invention may be stated broadly as residing in supplying to rotenone a stabilizing agent in any of various forms, such as an added oxidation inhibitor or retarder, or in a combined form producing toxic rotenone derivatives. or in combined forms from which regeneration of the rotenone will take place in use either with or without the regeneration of an oxidation retarder or other agent capable of protecting the regenerated rotenone. The invention also includes the methods of producing the rotenone derivatives and the various embodiments of the two following classes.

Briefly stated the various embodiments of this invention may be divided into two major classes, viz., class I where the rotenone per se is stablized by an added agent such as an oxidation retarder; class II where stable rotenone derivatives are obtained in the form of chemical combinations with the rotenone. As to class I, this may be divided into several groups: (1) rotenone and an oxidation retarder in solution in a common solvent; (2) the solution described under (1) applied to a powdered carrier or dust; (3) rotenone and an oxidation retarder in solution in a spray oil or the like through the medium of a common solvent; (4) an emulsion of a solution of rotenone containing an oxidation inhibitor, a mineral oil and a common solvent in water through the medium of a suitable emulsifying agent which will not promote hydrolysis, such as calcium caseinate, lecithin or triethanolamine stearate or oleate. As to class II where rotenone derivatives are employed there are at least five desirable embodiments: (1) the solution of the rotenone derivaties in the pine oils and other solvents herein mentioned; (2) the solution of the rotenone derivatives with a common solvent in spray oil or similar oil; (3) a dispersion of a stable rotenone derivative such as the oximes and hydrazones in water through the medium of a solvent for the derivative such as pine oils and the like herein mentioned; (4) a deposit of such rotenone derivatives upon a dust through the medium of the same type of solvents and removal of the solvent; (5) a dispersion of such rotenone derivatives in spray oil and water emulsion through the medium of a common solvent and an emulsifying agent which does not promote hydrolysis, such as substantially neutral or acidic emulsifying agents including calcium caseinate, lecithin and thiethanolamine oleate and stearate.

These aspects of the invention and others will be considered in greater detail. With reference to that form of the invention wherein a stabilizing agent is supplied in the form of an added oxidation inhibitor or retarder, apparently all organic agents employed as oxidation inhibitors or retarders for other purposes, for example as gum inhibitors for gasoline, may be used. This includes the monobenzylparaaminophenol above mentioned, and also alpha terpineol, "vanoline" which is paraphenyl-aminophenol, pyrogallol, hydroquinone, dibenzyl para-aminophenol and parahydroxyphenylmorpholene. Similarly other agents used as gum inhibitors in gasoline may be employed such as tributyl amine and the organic compounds of the non-gaseous members of the fifth group of the periodic system having a valence less than five which includes: monoaryl alkyl-, diaryl mono alkyl-, triaryl- and trialkyl arsines and corresponding stibines, bismuthines, phosphines and vanadines. Also arsine and stibine oxides such as aryl and alkyl aryl arsine and stibine oxides and substituted phenyl arsine oxides like paraethoxy phenyl-arsine and dimethyl phenyl arsine oxides and other arsenic, antimony and phosphorus compounds like arsenobenzol, cyclopentyl phenylstibine, phosphobenzol and the like. These organic agents all serve to retard and inhibit the oxidation of more or less readily oxidizable organic compounds, and consequently are useful for the stated purpose. This applies to all other of the known oxidation inhibitors included in this definition, and includes amines and other amino compounds than those heretofore mentioned.

In preparing stable insecticides containing rotenone per se by employment of any one or more of these added agents, the agent is supplied to the derris root or other form of rotenone in whatever physical form the insecticide is to be prepared, such as a powder or liquid. For example, the agent may be dissolved in a volatile solvent such as oil of camphor sassafrassy, pyridine, safrol, pine oil, "cellosolve" (monoethyl ether of diethylene glycol) and other solvents hereinafter mentioned or in any other solvent having the required solvent or common solvent properties. This solution may then be added in desired quantities to powdered derris root, or rotenone may be dissolved in the solution, either of these admixtures being then distributed through an inert powdered base if desired. Thus the rotenone material, before addition to the inert base, will have been intimately commingled with the oxidation retarder and the rotenone containing particles thereby sufficiently coated or enclosed to protect the rotenone and insure that the full action of the retarder will be exerted upon the rotenone material when subsequently deposited upon foliage to be treated. Similarly, the solution of oxidation retarder and rotenone may be employed as such or may be introduced into water or spray oils, spray oil emulsions, or other oily bases or the like through the medium of the common solvents, such as above mentioned, i. e. pine oils, oil of camphor sassafrassy, cellosolve and the like, the resultant liquids to be used as sprays or otherwise as may be desired. Thus in a mineral spray oil base, such as is well known in the art, paraphenyl-aminophenol, as a retarder, rotenone, and pine oil may be used. Here the pine oil acts as a common solvent for the rotenone, the retarder, and the spray oil, and the resultant insecticidal oil may be employed as a spray. If it be desired to prepare an emulsion, any appropriate soap may be introduced. Preferably, neutral or slightly acidic emulsifying agents will be employed such as triethanolamine oleate and stearate, or other neutral emulsifier such as calcium caseinate, and lecithin. In water containing emulsions of this character the retarder will be effective to stabilize the rotenone before and after use.

With reference to that phase of the invention wherein rotenone derivatives are prepared which are in themselves toxis and/or are capable of regenerating rotenone by hydrolysis, such derivatives are obtained by causing rotenone to react with organic compounds which in general react with ketones. Particularly, compounds here employed are nitrogenous compounds which are in themselves derivatives of amines. This includes such compounds as the hydroxylamines and the hydrazines. The resultant oximes and hydrazones present the desired stable rotenone derivatives sought by the present invention, inasmuch as these derivatives do not oxidize readily on exposure to light and air and hydrolyze slowly on contact with water to regenerate rotenone. Under the conditions of use, the rotenone will be released at such a rate as is most desirable for the presentation of the toxic characteristics of rotenone.

According to this invention, those nitrogenous compounds may be employed for reaction with the rotenone, which contain the radicals $$H_2N.NH—$$
$$H_2N.N=$$
$$H_2N.O—$$

the indicated valences being satisfied with hydrogen, alkyl, or aryl groups or a $NH_2$—CO— group as in semicarbazide or with metallic elements like Pb, Cu, Hg, etc. in the case of the —O—$NH_2$ group.

The above described nitrogenous substances will yield rotenone compounds containing radicals such as $$=N.NH—$$
$$=N.N=$$
$$=N—O—$$

the double bonds on the left being attached in each case to the carbon of the ketone group and the indicated valences on the right being satisfied with the group or groups described above as forming a part of the original nitrogenous compounds.

For example, representing rotenone as RCO, this will combine with hydroxylamine as follows:
$RCO + H_2NOH \rightarrow RC:N.OH + H_2O$.

Phenylhydrazine, which is a very desirable member of the hydrazines for this purpose will react with rotenone as follows:

$$RCO + H_2N.NH.C_6H_5 \rightarrow RC:N.NH.C_6H_5 + H_2O.$$

In addition to the specific hydroxylamine and phenylhydrazine mentioned to produce rotenone oxime and rotenone phenylhydrazone as above, the entire group of =N—O— or =N.N= compounds having two replaceable hydrogens on one nitrogen may be included as equivalents. Thus the alkyl derivatives of hydroxylamine may be used, or the aryl derivatives, where the H of the OH group is replaced with a methyl, phenyl, or similar group. Each of these may be combined with the rotenone (RCO) to yield RC:NOR' where R'=methyl, ethyl, phenyl, or the like, or a metallic element like Cu, Pb, Hg, etc. Again the whole range of hydrazines may be used to react with the rotenone, including the various aryl hydrazines, alkyl hydrazines, and alkyl-aryl hydrazines. Thus, in addition to hydrazine and phenyl-hydrazine, we may use methyl hydrazine, methyl-ethyl hydrazine, asymmetrical di-ethyl hydrazines, asymmetrical di-benzyl hydrazine, ethyl benzyl hydrazine, and the like, yielding $RC:N.NH_2$ and RC:N.N.R'R'' or RC:N.NH.R' where R' and R'' are aryl or alkyl radicals. Similarly semi-carbazide ($NH_2.CO.NH.NH_2$) may be employed, yielding the semi-carbazone $$RC:N.NH.CO.NH_2.$$

The hydrogens of the —CO—NH₂ group may be replaced by alkyl or aryl groups.

The oximes, hydrazones and related products resulting from the chemical union with rotenone according to this invention are such as can be dissolved in certain volatile solvents. While the oximes or hydrazones are generally insoluble in the ordinary solvents such as the petroleum oils used for orchard and garden pest control, they are nevertheless soluble in solvents such as oil of camphor sassafrassy, safrol, pine oils, and the like.

When the rotenone derivatives which are the subject of this invention are to be combined with a spray oil base, a common solvent both for the rotenone derivative and the oil will be employed, for example pine oil. Otherwise such solvent may be used as produces a desirable form of insecticide. In addition to using the rotenone derivatives in sprays, said derivatives may also be dissolved in one of the more volatile solvents and such solution used to deposit the rotenone derivative upon an inert material such as infusorial earth or the like from which the solvent may be evaporated and the dry powder used for dusting purposes. Furthermore, the rotenone derivatives may be dissolved in a suitable common solvent like pyridine, pine oil, oil of camphor sassafrassy and cellosolve, and then dispersed in water by pouring the solution into water with agitation. The water containing the dispersed rotenone derivatives may be used as an insecticide.

In causing rotenone to react with the above defined nitrogeneous agents such as the hydrazines and hydroxylamines, the reaction may be brought about readily by combining the materials in proper quantities and in a suitable reaction vessel under appropriate conditions.

To form the phenylhydrazone of rotenone, 5 grams of rotenone, 7.5 grams of phenylhydrazine hydrachloride, and 4.2 grams of freshly fused sodium acetate were dissolved in 50 ml. of absolute ethyl alcohol in a flask and refluxed for 5 hours on a water bath. The mixture was filtered while hot and the phenylhydrazone crystallized from the filtrate upon cooling. The crystals were purified by several recrystallizations from absolute ethyl alcohol. The melting point of the phenylhydrazone of rotenone was 245° C.

To form the oxime of rotenone, 5 grams of rotenone, 3.7 grams of hydroxylamine hydrochloride, and 4.2 grams of freshly fused sodium acetate were dissolved in 80 ml. of absolute ethyl alcohol in a flask and refluxed on a steam bath for 4 hours. The mixture was filtered while hot and the oxime crystallized from the filtrate upon cooling. The crystals were purified by repeated recrystallization from methyl alcohol. The melting point of the oxime of rotenone was 250° C.

The rotenone derivatives and compositions described by this invention are useful for various insecticidal purposes, particularly as insecticides for garden and orchard pest control when used in conjunction with spray oil or with spray oil emulsions containing neutral or acidic emulsifying agents, as solutions in suitable solvents or when dispersed in water or on dusts. Where the metal derivatives of rotenone oximes are produced, they constitute good fungicides. The above mentioned rotenone derivatives, while often not in themselves sufficiently toxic to be used as fly sprays, nevertheless may be added to fly sprays with satisfactory results, for example, as an addition to oil sprays containing pyrethrum extractives.

The nature of the above described derivatives of rotenone is such that they are not subject to rapid oxidation on contact with air or rapid hydrolysis on contact with water. Not only do these derivatives oxidize or hydrolyze slowly, but, where the hydrazones hydrolyze with a resultant formation of the original rotenone and hydrazine, the presence of the hydrazine results in further protection to the rotenone inasmuch as phenylhydrazine and the like exhibit distinct anti-oxidant properties. Phenylhydrazine is therefore a particularly valuable agent for inclusion in plant insecticides, either as the sole active agent or as one of the active agents. It may also be employed as an additive to derris root or other rotenone carrier as an oxidation retarder either alone or with other retarders as herein described.

The rotenone derivatives above described may be effectively employed in at least five different forms: namely, dissolved in a suitable solvent, dissolved in spray oil by the means of a suitable common solvent, dispersed in water by the means of a suitable solvent, as a deposit on a dust and in oil-and-water emulsions. As to the first form, the rotenone may be dissolved in a material like pine oil or cellosolve and the solution used as an insecticide. As to the second form, the rotenone derivatives may be dissolved in kerosene or like petroleum oils or spray oils by means of a common solvent and the solution used as an insecticide. As to the third form, the rotenone derivatives such as the oxime or hydrozone as previously described may be placed in solution in a suitable solvent, such as oil of camphor sassafrassy, pine oil, cellosolve, pyridine and the like. The addition of such a solution to water with agitation produces a stable suspension of the rotenone derivatives which may be easily maintained by mild agitation and used as such as an insecticide. As to the fourth form, instead of introducing the above described solution of rotenone derivatives into water, it may be mixed with inert dust particles and the solvent removed by evaporation leaving the rotenone derivatives as such on the dust. As to the fifth form, the solution of rotenone in oil promoted by the use of a common solvent may be emulsified with water employing emulsified agents not capable of promoting hydrolysis of the rotenone derivatives in the emulsion. Inasmuch as alkaline agents will promote rapid hydrolysis of these derivatives it is necessary to limit the agents to substantial neutral or acidic materials such as triethanolamine oleate or stearate, calcium caseinate, or lecithin which is a naturally occurring emulsifier found in the yolk of egg and in many seeds, or other emulsifier having the described properties.

It is to be understood that the disclosures hereof are merely illustrative of the invention and are not to be taken as limiting.

Thus, where a kerosene solution of rotenone is desired, the rotenone may be employed as rotenone solvate, which is rotenone containing one molecule of carbon tetrachloride of crystallization. The rotenone therein may be stabilized by means of any of the gum inhibitors above mentioned as stabilizers for rotenone. Such a kerosene solution would contain, for example, 0.10% of rotenone and a correspondingly small percentage of the selected stabilizer, for example, para-benzylaminophenol or hydroquinone, and a common solvent such as pine oil or any of the other common solvents previously mentioned.

I claim:
1. An insecticide comprising a rotenone derivative of the class:

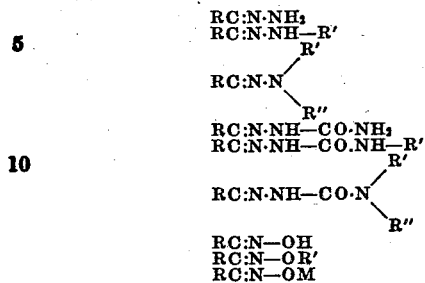

where RC is the radical left when the ketone oxygen is removed from rotenone, where R' and R'' are the same or different aryl or alkyl radicals, and M is a metallic group.

2. An insecticide according to claim 1 containing also a mineral spray oil and a common solvent for the oil and the rotenone derivative.

3. An insecticide comprising rotenone oxime.

4. An insecticide comprising a rotenone hydrazone.

5. An insecticide comprising a rotenone phenylhydrazone.

ARTHUR L. BLOUNT.